United States Patent Office 2,813,123
Patented Nov. 12, 1957

2,813,123
STABLE DRY POWDER COMPOSITIONS CONTAINING PANTOTHENYL ALCOHOL AND METHODS OF PREPARING SAME

William Valentine, Nanuet, and Joseph F. Weidenheimer, Pearl River, N. Y., assignors to American Cyanamid Company, New York, N. Y., a corporation of Maine No Drawing. Application May 14, 1956,
Serial No. 584,471

6 Claims. (Cl. 260—561)

This invention relates to new compositions consisting of substantially dry powders having incorporated therein a relatively large proportion of pantothenyl alcohol and methods of preparing such powders.

As is well known, pantothenic acid is a member of the B complex vitamins which occurs everywhere in animal and plant tissue; moreover, it can be prepared synthetically. Only the dextrorotatory form has vitamin activity; it has the following structural formula:

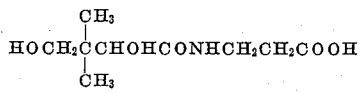

Pantothenic acid is an unstable viscous oil which is extremely hygroscopic. Furthermore, it is easily destroyed by acids, bases, and heat. Pantothenic acid, as a nutritional supplement is not generally used by itself; it is usually used in conjunction with various other necessary nutritional elements. Because of its unstability to both heat and hydrolysis (alkaline or acidic), pantothenic acid tends to be dissipated before it can be used. For this reason it is necessary to find some other form of this nutritional element.

Attempts have been made in the past to use various salts of pantothenic acid, particularly the sodium and calcium salts. These salts partially answer the problems presented by pantothenic acid in nutrition; however, the results obtained with these salts are far from desirable. The sodium salt is crystalline, but it is so highly hygroscopic that it can be stored in sealed ampules only. It is thus little better than pantothenic acid. Instead of being oily and viscous like pantothenic acid, the calcium salt is a crystalline material and is only moderately hygroscopic as compared to pantothenic acid. However, the major difficulty here stems from the fact that calcium pantothenate, in the same manner as pantothenic acid, is subject to acid hydrolysis. Since many of the nutritional and pharmaceutical preparations in which this nutritional adjunct might be found are of an acid nature (a pH lower than 5, for example), the use of calcium pantothenate is very little better than that of pantothenic acid.

Pantothenyl alcohol is a viscous, slightly hygroscopic liquid. The active form has the following structural formula:

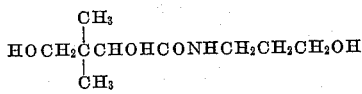

Unlike the derivatives discussed above, pantothenyl alcohol is reasonably stable to usual sterilization time and temperature in aqueous solutions adjusted to pH 3–4. Moreover, the temperatures need not be sterilization temperatures; for example, in a liquid multi-vitamin preparation of pH 4, 60% of the original sodium pantothenate was destroyed at 45° C. within six weeks, while the concentration of pantothenyl alcohol did not change. At 60° C. and pH 4, pantothenyl alcohol was decomposed more slowly (about 10% loss in 4 weeks) than pantothenic acid (65% loss in 4 weeks); see, Rubin, J. A. P. A., scientific edition, vol. 37, page 502 (1948).

Pantothenyl alcohol has found little use, however, in nutritional preparations, for the reason that it is extremely difficult to handle; primarily because of its highly viscous state. Its high viscosity (it has the consistency of thick maple syrup) has presented almost insuperable obstacles to its commercial use, since it is nearly impossible to accurately weigh and manipulate quantities of pantothenyl alcohol in making up nutritional preparations. Accordingly, a specific object of this invention is the preparation of a dry, stable, free-flowing pantothenyl alcohol-containing powder suitable for nutritional use. According to this invention, these and other objects are achieved by combining pantothenyl alcohol in admixture with silica aerogel carriers.

The silica aerogels of this invention are any of a number of commercially available aerogels produced in either the vapor phase or the liquid phase. The most important characteristic of these aerogels is their extremely large surface area; this may run between 100 to 400 square meters/gram. The silica aerogels are highly porous dry powders having a particle size of from about 5 millimicrons to about 5 microns and preferably a pH of 9 or lower. They contain somewhere between 85% to 98% silicon dioxide, the remainder being made up of various organic and inorganic constituents. The silicon dioxide is the only important constituent of the silica aerogel; as long as the other constituents are non-toxic, their identity is immaterial.

On a weight/weight basis the proportion of pantothenyl alcohol to the silica aerogel can be as high as about 65% pantothenyl alcohol to about 35% silica aerogel. Of course, smaller quantities of the pantothenyl alcohol can be used; this is merely the practical upper limit of the pantothenyl alcohol. When larger quantities of pantothenyl alcohol are used, the dry powder which is initially obtained, does not remain a dry powder on standing at high relative humidity. For example, if 70 parts by weight of pantothenyl alcohol are used to 30 parts by weight of silica aerogel, the powder will remain dry and free-flowing after 3 days at room temperature and about 45% relative humidity. On the other hand, if this same powder is stored for 3 days at room temperature and about 75% relative humidity, the powder becomes moist and the particles are no longer free-flowing.

As will be seen below, the usual procedure for obtaining these dry free-flowing powders is one of intimately inter-mixing the two components with agitation. The order of addition is immaterial; the alcohol may be added to the aerogel and vice versa. No substantial problem is encountered in obtaining the desired product even when large quantities of the components are utilized. However, it may be preferable to utilize some material, such as a solvent (e. g. ethyl alcohol, water, etc.), to make the handling of large quantities of the materials more convenient. This last procedure or its equivalent is not, however, essential.

As specific examples, certain embodiments of our invention are set forth below in an illustrative sense only. In no way, however, is the invention to be considered limited by the following examples, the scope of the invention being limited by the appended claims.

Example 1

To 50 g. of a silica aerogel, having a particle size of about 3–5 microns and a surface area of about 110 to 150 square meters/gram, in a beaker were added gradually with stirring 50 g. of pantothenyl alcohol. After thorough blending the mixture was maintained at 75% relative humidity and room temperature (24° C.). After 3 days under these conditions, the powder remained free-flowing and substantially dry.

Example 2

The procedure of Example 1 was repeated using 40 g. of the silica aerogel of Example 1 and 60 g. of pantothenyl alcohol. After 3 days at 75% relative humidity and 24° C. the blend remained free-flowing and substantially dry.

Example 3

The procedure of Example 1 was repeated using 50 g. of a silica aerogel having a particle size of about 15 to 20 millimicrons and a surface area of about 175 to 200 square meters/gram. This silica aerogel was added with stirring to 50 g. of pantothenyl alcohol. After thorough blending the mixture was maintained at 75% relative humidity and room temperature (24° C.). After three days under these conditions the powder remained free-flowing and substantially dry.

Example 4

The procedure of Example 3 was repeated using 40 g. of the silica aerogel of Example 3 and 60 g. of pantothenyl alcohol. After three days at 75% relative humidity and 24° C. the blend remained free-flowing and substantially dry.

We claim:

1. A stable, substantially dry, free-flowing powder comprising pantothenyl alcohol and a silica aerogel, said powder containing not substantially more than 65% pantothenyl alcohol on an anhydrous weight basis, said silica aerogel having a surface area of from about 100 to about 400 square meters/gram and being present in an amount not substantially less than about 35% by weight.

2. A stable, substantially dry, free-flowing powder as in claim 1 wherein the particle size of said silica aerogel is between about 5 millimicrons and about 5 microns.

3. A stable, substantially dry, free-flowing powder comprising pantothenyl alcohol and a silica aerogel having a particle size of from about 3 to about 5 microns and a surface area of from about 110 to about 150 square meters/gram, said pantothenyl alcohol and said silica aerogel being present in a ratio of from about 40% to 65% by weight of said pantothenyl alcohol to from about 35% to about 60% by weight of said silica aerogel.

4. A process for the production of a stable, substantially dry, free-flowing powder containing a major amount of pantothenyl alcohol, which comprises adding an amount, not substantially greater than 65 parts by weight on an anhydrous basis, of pantothenyl alcohol to not substantially less than 35 parts by weight of a silica aerogel having a particle size of from about 5 millimicrons to about 5 microns and a surface area of from about 100 to about 400 square meters/gram and thoroughly blending the mixture so obtained.

5. A process as in claim 4 wherein said silica aerogel has a particle size of from about 3 to about 5 microns and a surface area of from about 110 to about 150 square meters/gram.

6. A process as in claim 5 wherein the ratio of said pantothenyl alcohol to said silica aerogel is in the range of 40 to 65 parts by weight of said pantothenyl alcohol on an anhydrous basis to 35 to 60 parts by weight of said silica aerogel.

References Cited in the file of this patent

UNITED STATES PATENTS 2,413,077   Schnider _____ Dec. 24, 1946

OTHER REFERENCES

Iller: The Colloid Chemistry or Silica and Silicates, Cornell Univ. Press, Ithaca, New York, 1955, Table XII, p. 172 cited.